United States Patent

Zabler et al.

[11] 4,162,083
[45] Jul. 24, 1979

[54] LEVELING CONTROL FOR MOTOR VEHICLES

[75] Inventors: Erich Zabler, Karlsruhe; Heiner Gassmann, Esslingen; Steffen Schneider, Möglingen; Steffen Straub, Stuttgart, all of Fed. Rep. of Germany

[73] Assignee: Robert Bosch GmbH, Stuttgart, Fed. Rep. of Germany

[21] Appl. No.: 836,886

[22] Filed: Sep. 23, 1977

[30] Foreign Application Priority Data

Oct. 15, 1976 [DE] Fed. Rep. of Germany ....... 2646547

[51] Int. Cl.$^2$ ............................................. B60G 11/26
[52] U.S. Cl. .................................. 280/703; 280/6 H; 280/707
[58] Field of Search ................... 280/104, 6, 6.11, 6 H, 280/124 F; 180/41; 200/61.52

[56] References Cited

U.S. PATENT DOCUMENTS

| 3,539,197 | 11/1970 | Ramaud | 280/104 |
| 3,552,763 | 1/1971 | Yasin | 280/104 |
| 3,917,307 | 11/1925 | Shoebridge | 280/104 |

Primary Examiner—Joseph F. Peters, Jr.
Assistant Examiner—Gene A. Church
Attorney, Agent, or Firm—Edwin E. Greigg

[57] ABSTRACT

A leveling control mechanism for motor vehicles includes an electric pump and a solenoid valve for raising and lowering the vehicle body and a leveling switch with an electronic damping device. The periodic measurement of the distance from the vehicle axle to the vehicle body is carried out by a mechanical-electrical converter, which converts the rotation of a shaft into an electrical signal. During acceleration and deceleration of the vehicle, as well as during the occurrence of centrifugal forces, suitably situated inertial switches inhibit the response of the leveling control mechanism.

10 Claims, 4 Drawing Figures

LEVELING CONTROL FOR MOTOR VEHICLES

BACKGROUND OF THE INVENTION

The invention relates to a leveling control mechanism for a motor vehicle. More particularly, the invention relates to a leveling mechanism for only one axle of a vehicle, with hydraulic actuators, at least one electromagnetic valve and a source of pressurized hydraulic fluid. Suitable mechanical linkage between the axle and the body of the vehicle actuates a switch whose signals are damped electronically.

A leveling control of this type is known from German laid open application No. 2,016,963. In this apparatus, the leveling control is inhibited during the negotiation of curves by the cooperation of two level-responsive switches. The known leveling control is too expensive for single axle regulation. In addition, the control should properly also be inhibited during acceleration and deceleration. Failure to do so is especially serious when a vehicle brakes for a stop light, etc., so that the vehicle dips forward. If the leveling control is not shut off, the charge is removed from the rear spring elements. During a subsequent fast start, the rear end of the vehicle will descend toward the road because the rear spring elements are void.

OBJECT AND SUMMARY OF THE INVENTION

It is, therefore, a principal object of the present invention to provide a leveling control mechanism for vehicles in which the aforementioned disadvantages are overcome. In particular, it is an object of the present invention to provide a leveling control mechanism in which the leveling control process is inhibited during linear accelerations and decelerations of the vehicle and also during the occurrence of lateral forces due to centrifugal effects, e.g. during the negotiation of curved tracks.

These and other objects are attained, according to the invention, by providing a leveling control mechanism which includes an electronic damping device, disposed preferably on a printed circuit board, and housed, together with the mechanical-electrical converter, in a small, compact housing. An activating lever hinged on the vehicle axle has a clamp fastener on its rotary shaft, which is secured with the aid of a frangible screw. Thereby, once chosen, the setting cannot be accidentally changed.

An inductive transducer is used as a mechanical-electrical converter, and is arranged on a circular arc in the sweep angle of the pivoting movement of the activating lever. In this manner, the converter can be placed in the housing without requiring much space, and there is still room for the inertial switch.

An exemplary embodiment of the invention is shown in the drawing and is more closely described in the following description.

DESCRIPTION OF THE PREFERRED EMBODIMENT

Figure 1:
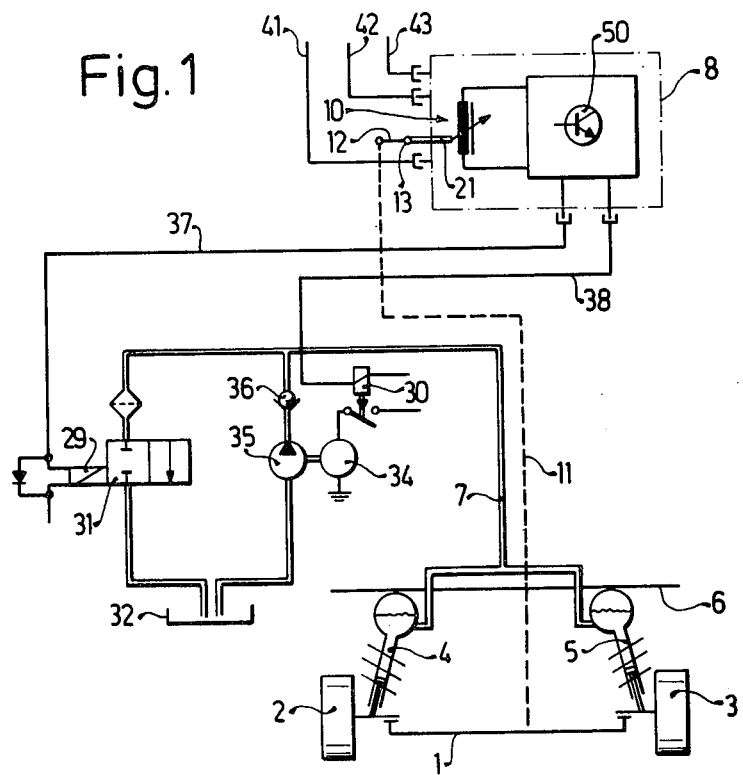
FIG. 1 is a schematic illustration of the level regulating device.

Turning now to the drawings, there is shown a motor vehicle provided with an axle 1 to which are attached two wheels 2 and 3 that are supported by spring elements 4 and 5 opposite a vehicle body 6. The spring elements 4 and 5 are hydro-pneumatic and their hydraulic part is connected by a common supply line to a hydraulic pump 35 as a hydraulic pressure source, and to a solenoid valve 31. The hydraulic pump is driven by an electric motor 34.

Figure 2:
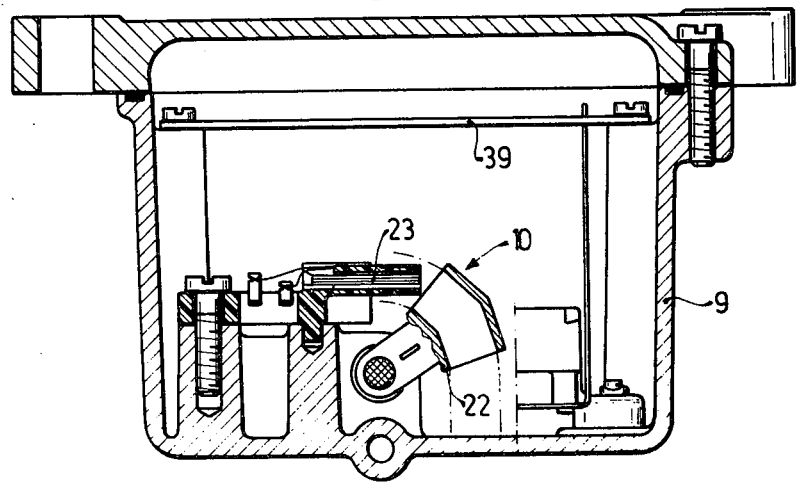
FIG. 2 is a first cross-sectional view of the housing, illustrating the mechanical-electrical converter.
Figure 3:
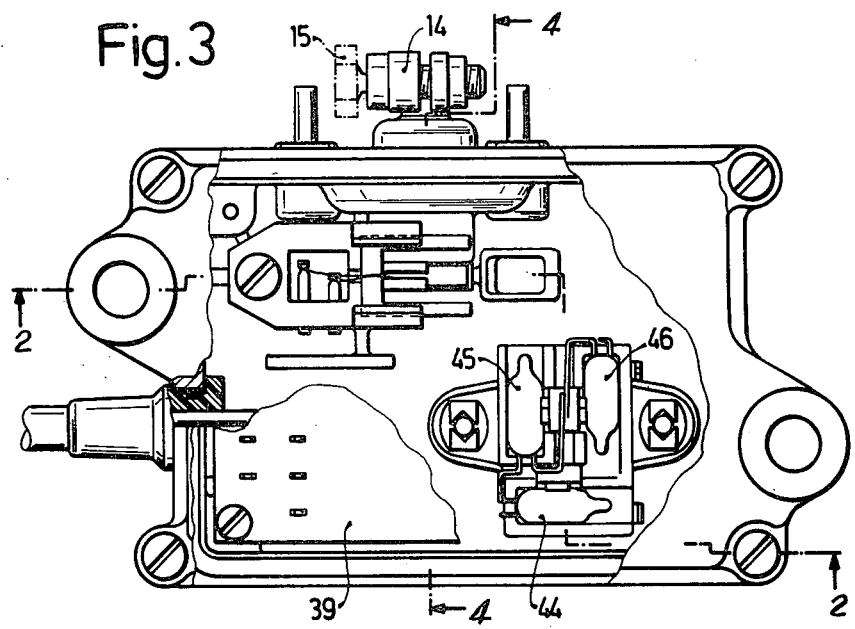
FIG. 3 is a second cross-sectional view of the housing showing the inertial switch as well as the frangible screw.

A level switch 8 is placed in a housing 9 (FIG. 2). It has a converter or transducer 10, which can be activated by a linkage 11 associated with the vehicle axle 1 and by a rotatable lever 12 that is fixed on a shaft 13 by a fastener means 14. This fastener means 14 is provided with a removable frangible screw 15 that is represented in FIG. 3 by means of a broken line. This arrangement of elements is believed to be necessary because when the level regulator is built at the factory any later tampering with the device will become immediately apparent.

The lever shaft 13 is supported in a housing bore 24, (FIG. 4) which is sealed from the outside by a dust cap 16. Immediately adjacent to the dust cap 16 in the housing bore 24 are provided an O-ring 17, a first bushing guide 18, a lubrication ring 19, and a second bushing guide 20. In this manner the lever shaft is well sealed against entry of dust as well as being properly lubricated in the housing 9.

The inner end of the lever shaft 13 carries an arm 21, the free end of which is provided with an integral tubular member 22 that is pivotably secured to the end of the lever. The tubular member 22 comprises a short circuiting means which functions together with a leaded core spool 23, (see plan view of FIG. 3). It is believed clear from this view of FIG. 3 that the tubular member 22 can swing up and over the spool 23 so that the spool 23 is completely telescoped into the tubular member 22. The spool 23 through which current can flow together with the tubular piece 22 form a mechanical-electrical converter 10, which functions as the inductive transducer for the level switch 8, in that it changes the rotation of the lever shaft into an electrical signal.

An electromagnet 29 activates a 2/2-way valve 31 of the solenoid valve, which either maintains the pressure in the line 7 or releases it to a reservoir 32. A relay 30 is intended to turn an electric pump 35 on and off, which pump can pull the fluid out of the reservoir 32 and push it through a return valve 36 into the line 7.

The electromagnet 29 and the relay 30 each have connecting lines 37 and 38 that extend to the level switch 8, that further includes electronic structural elements, which are not shown in detail. A part of these structural elements is formed as an electronic damping device 50 that serves to damp the signals coming undamped from the mechanical-electrical converter.

Figure 4:
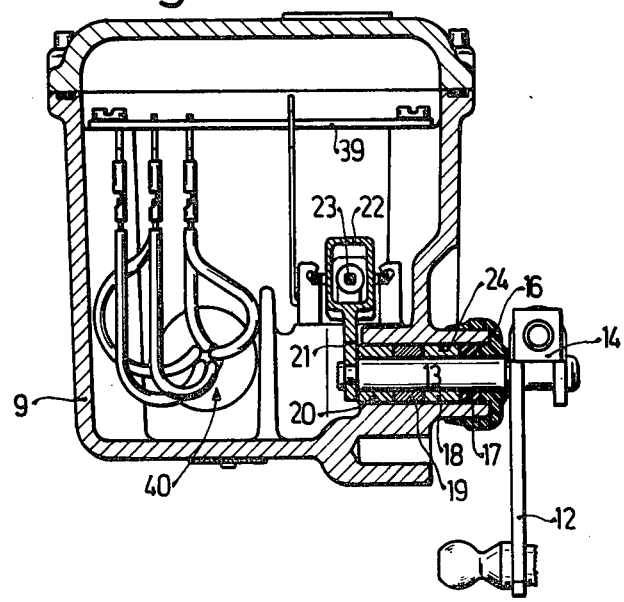
FIG. 4 is a third cross-sectional view of the housing showing the connectors for the printed circuit board.

A printed circuit board 39 (FIG. 3) which includes the electrical components is provided in the housing 9 together with the mechanical-electrical converter 10 (FIG. 4). Thus, it will be readily appreciated that the level switch 8 is very compact and requires very little space. The printed circuit board 39 has a plug-in connector with a 5-strand cable 40, the individual strands of which along with their connectors, are represented in FIG. 1. This 5-strand cable thus includes the leads 37 and 38, a single lead 41, which leads to a brake light of the vehicle, a ground wire 42 and a supply lead 43.

The housing 9 also includes a combination of three mercury switches 44, 45 and 46 (FIG. 3), whose lead connectors are integrated into the printed circuit board in a manner not shown in detail. The mercury switches 44, 45 and 46 comprise inertial switches and are built into the level switch, and hence into the vehicle, so that the one (44) only operates during acceleration of the vehicle, and the other two are brought into operation by lateral forces due to centrifugal acceleration. The device which transmits signals of vehicle deceleration to the level switch 8 is the lead running parallel to the mercury switches 44, 45 and 46, namely the brake light lead 41 mentioned earlier.

Method of Operation

In the starting position, the solenoid valve 31 and the relay 30 are without current, the 2/2-way valve is blocking the connection to the reservoir 32, and the electric pump 35 receives no current, so that the pump is not operational. The tubular member 22, which functions as a short circuit means, is positioned with one of its rims positioned adjacent to an edge portion of the spool 23. The inductance present in this position allows the magnetic valve 31 and the relay to remain at rest.

If a load is placed on or taken from the vehicle, the tubular member 22 changes its position relative to the spool 23 and the inductance is altered. Every change in inductance affects the electronic switch elements in the printed circuit board 39 and the electrical damping device 50 assures that short term changes in the distance between the axle 1 and the body 6 remain without effect, i.e., the mechanical elements function properly but the electronic circuitry prevents the further transmission of the switch signals. When such changes are of longer duration the level switch 8 controls the magnetic valve 31 to lower the vehicle body, or else it switches the relay 30 into a different position to raise the vehicle body 6. In the latter position the electric pump 35 is supplied with current to raise the vehicle body and the periodic switch-back into the original position occurs immediately.

The changing of the vehicle body position, however, is prevented not only during short term changes in position, but also during acceleration, deceleration and while negotiating curves. This is achieved by the mercury switch 44 during acceleration and the mercury switches 45 and 46 during travel on curves. During deceleration, the corresponding signal is taken from the brake light lead 41.

In this manner the object of the application avoids the problem of having the relaxed spring elements 4 and 5 completely released by the pressure release during a hard stop and prevents the vehicle from falling on the unloaded springs, or even down onto the axle during subsequent acceleration.

The same considerations apply to the traversing of S-curves and for rapid braking after very fast starts. In all such conditions, the mercury switches 44, 45 and 46 (through the brake light switch) prevent the operation of the leveling regulator.

In place of the mercury switches 44, 45 and 46, other suitable inertial switches, for example, pendulums or other inert masses can also be used. In addition, it should be noted that the mechanical-electrical converter 10, which is shown here as an inductive transducer, can be embodied in another form, for example, as a contactless converter of another type or as a sliding contact.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A leveling system for a vehicle which includes a chassis and a body, said system including:
   a source of hydraulic fluid under pressure;
   a leveling means connected between said chassis and said body of said vehicle to raise and lower the body with respect to said chassis by hydraulic pressure supplied by said source of hydraulic pressure;
   indicator means, including linkage between said chassis and said body to provide a signal related to the relative vertical distance therebetween; and
   electronic circuit means including damping means for processing and damping said signal and for controlling said leveling means in dependence thereon, and wherein the improvement comprises:
   said indicator means includes a housing attached to said chassis, said housing containing a converter for converting mechanical motion to an electrical signal and further includes a pivoting lever attached to said converter and to said chassis to thereby convert the relative motion of said chassis with respect to said body into said signal; and
   said leveling means includes at least one solenoid valve, controlled by said electronic circuit means in dependence on said damped signal.

2. A leveling system as claimed in claim 1, in which said converter includes a tubular member that can be activated by means of said lever.

3. A leveling system as claimed in claim 1, in which further plural inertial switches are provided, said inertial switches comprising mercury elements arranged to operate during excessive forces applied to said vehicle and such contact preventing operation of said leveling means in said system.

4. A leveling system as claimed in claim 3, in which said inertial switches are connected in parallel with a brake light switch of the vehicle braking system and through which operation of said leveling means in said system is prevented by a switching on of said brake light switch.

5. A leveling system as claimed in claim 1, in which said leveling means is linked to said chassis and has undamped movement in its swinging motion on said converter, and further that said converter includes wear-free elements, which are arranged on a circular arc in the sweep angle of the swinging motion.

6. A leveling system as claimed in claim 5, in which said leveling means includes a lever means arranged to cooperate with a rotating shaft by a fastener means, said elements being cooperatively retained by a frangible screw means.

7. A leveling system as claimed in claim 1, in which said electronic damping means, as well as bypass connections, are provided on a printed circuit board.

8. A leveling system as claimed in claim 3, in which said converter and said electronic damping means, as well as the inertial switch, are arranged in a common housing and thereby receptive of any inordinate forces.

9. A leveling system as claimed in claim 2, in which said converter includes a spool means which is wound around the central beam of a preferably leaded core provided with an E-shaped cross section.

10. A leveling system as claims in claim 5, in which said converter includes a spool means which is wound around the central beam of a preferably leaded core provided with an E-shaped cross section.

* * * * *